Dec. 3, 1935.  H. H. LINN  2,023,330
GATE CONTROL FOR VEHICLE DUMP BODIES
Filed Dec. 10, 1930  2 Sheets-Sheet 1
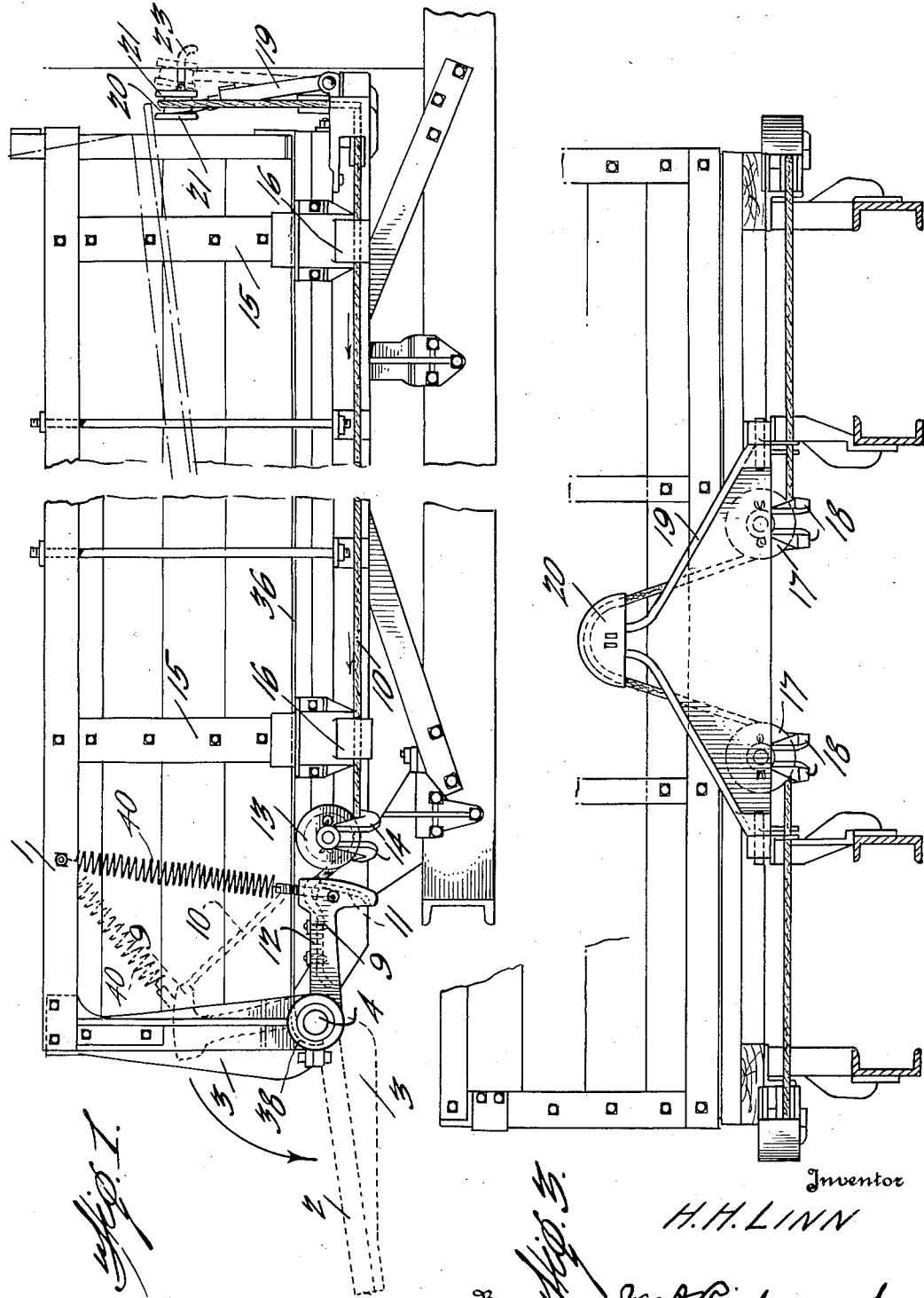

Dec. 3, 1935.  H. H. LINN  2,023,330
GATE CONTROL FOR VEHICLE DUMP BODIES
Filed Dec. 10, 1930  2 Sheets-Sheet 2
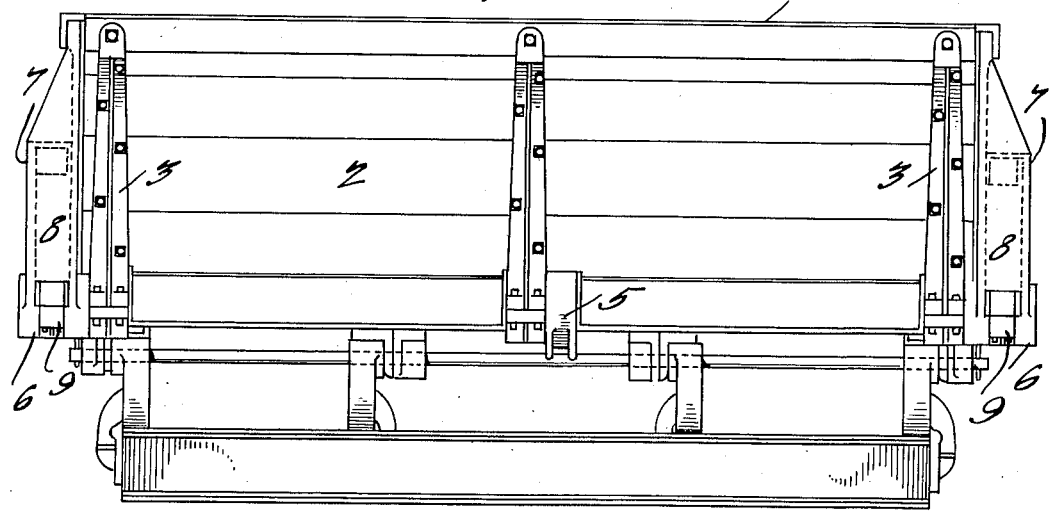
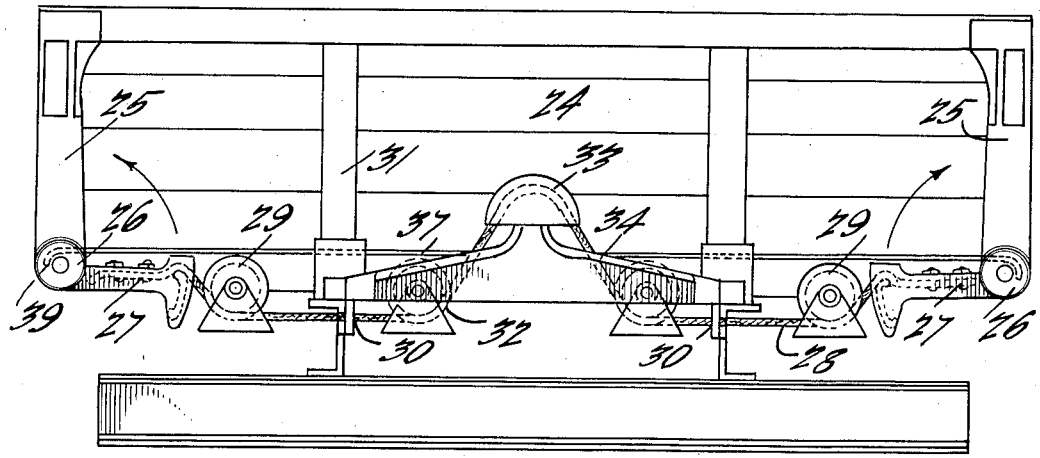
Inventor
H. H. LINN Patented Dec. 3, 1935

2,023,330

UNITED STATES PATENT OFFICE 2,023,330

GATE CONTROL FOR VEHICLE DUMP BODIES

Holman Harry Linn, Morris, N. Y., assignor to The Linn Manufacturing Corporation, Morris, N. Y., a corporation of New York Application December 10, 1930, Serial No. 501,451

4 Claims. (Cl. 298—23)

This invention is directed to dump bodies for vehicles, and provides certain improvements for automatically opening and closing the load-controlling element, whether end-gate or side-board, in the movement of the dump body.

Mechanically operated dump bodies are mounted for swinging movement about a transverse or longitudinal axis of the chassis, discharging in the first instance through the end of the body and controlling such discharge through a movable end or tail gate, and discharging in the second instance through either side of the body and controlling such discharge through movable side-boards. Conventionally, these load-controlling elements, whether tail-gates or side boards, are either upfolding, that is, supported on an axis at the top of the body, or down-folding, that is, supported at the bottom of the body. The present invention is more particularly concerned with the down-folding element, which is to be preferred owing to its directing the load well beyond the vehicle structure, and its complete opening of the full discharge area of the dump body.

The primary object of the present invention, therefore, is the provision of means whereby the load-controlling element, whether tail-gate or side-board, is automatically released for opening or load-discharge movement in the initial dump movement of the dump body and automatically returned to closing position in the return movement of such body, the automatic control of such operations being incident to the movement of the dump body.

A further and important object of the present invention is the provision of means whereby the load-controlling element, whether tail-gate or side-board, is automatically released for full opening movement during the period in which the dump body is moving through a relatively small movement in the upward or dumping direction in order that the tail-gate or side-board may be fully opened at a time when the movable end of the dump body is at a comparatively slight elevation. Under this arrangement, the tail-gate or side-board is in full discharge position long before the dump body has reached a full dumping position, with the result that the tail-gate or side-board is protected against injury from any article in the dump wagon which may be started toward the tail-gate or side-board under a relatively slight inclination of the dump body.

A further object of the invention is the provision of automatic opening and closing means for the load-controlling element, with such means arranged for selective operation with respect to its automatic closing function, whereby the dump body may be returned to normal position with the tail-gate or side-board remaining in open position, at the will of the operator.

The invention comprises an operating cable or cables connected to and movable with the dump body and having a length sufficient to permit full opening movement of the tail-gate or side-board, a cable lift being arranged in the path of movement of the cable as the dump body returns to normal position to take up a sufficient length of such cable to draw the tail-gate or side-board to closed position, the cable, as the dump body moves toward dumping position, moving free of such lift to provide that excess cable length necessary to permit opening movement of the tail-gate or side-board. The cable lift is arranged for manually governed shifting into and out of the path of the cable to permit return movement of the dump body without corresponding closing movement of the tail-gate or side-board whenever desired.

The invenion is illustrated in the accompanying drawings, in which:—

Figure 1 is a view in side elevation, illustrating sufficient of a dump body and vehicle to show the application of the improved control means, the load-controlling element being here shown as a tail-gate.

Figure 2 is an elevation of the tail-gate end of the same.

Figure 3 is an elevation of the opposite or head end of the dump body, showing particularly the cable lift.

Figure 4 is an end elevation of a dump body of the side-board discharging type, the invention being shown applied thereto.

In the form shown in Figures 1, 2 and 3, the dump body 1, otherwise of conventional form or design, is of end-discharging type, that is, provided with a tail-gate 2. The tail-gate is, through brace arms 3, keyed on a shaft 4 rotatively supported in a center bracket 5 extending beneath the dump body, and side brackets 6 secured to and extending vertically of the side walls of the dump body. The side brackets are of hollow form, opening toward the front of the dump body, presenting side walls 7 and a rear wall 8, at least for a portion of their heights.

A cable-arm 9 is keyed on each end of the tail-gate shaft 4, preferably between the side walls of the side brackets 6, the relation of these arms to the tail-gate being such that when the tail-gate is in closed position the arms are in the horizontal plane of the dump-body, and when the tail-gate is in fully opening position, the free ends of the arms are in contact with and stopped by the rear walls of the side brackets 6.

The free ends of the cable-arms 9 are connected by a cable 10, the respective ends of the cable being secured in a channel 12 extending lengthwise the cable arm and cooperating with a channel 11 arranged lengthwise a somewhat elongated head of the arm in operation. The cable, secured at its respective ends to the cable arms at the ends of the shaft 4, extends lengthwise the dump body and across the front or head end thereof. In its extension lengthwise the dump body, the cable is guided in pulleys 13 having guards 14 to prevent displacement of the cable and, if desired, the lower ends of the side-board stakes 15 of the dump body may be provided with eyes 16 for additionally guiding the cable.

The cable, in its portion extending transverse the head of the dump body, is guided in pulleys 17 with guards 18 so that this portion of the cable moves upwardly and downwardly with the dump body. Mounted for swinging movement on the chassis at the head end of the dump body is a jack 19 carrying a cable lift 20. The cable lift 20 is in the form of a semi-circular body, the surface of which is designed to be engaged by the cable, the transverse dimension of this cable-engaging surface being greater than the diameter of the cable to insure cooperation, and such surface having edge flanges 21 to prevent cable displacement. To insure that any cable slack as may occur from time to time may be taken up, it is contemplated that the means for securing the cable terminals in the channel 12 is such as to permit convenient lengthwise adjustment of the cable, as may be necessary.

The jack 19 is mounted for swinging in a plane longitudinally of the dump body, and may be moved into either a forward or rear position through a rod 23 operable by the driver. In the rear position, the cable lift is in the path of movement of the cable incident to the downward movement of the dump body, while in the forward position of the jack the cable lift is beyond the path of movement of the cable, as clearly shown in Figure 1. This capability of adjustment of the cable lift allows the operator to insure full automatic opening and closing of the tail-gate or automatic opening thereof without closing movement as the dump body returns to normal position, as may be desired.

With the cable 10 of appropriate length, it is apparent that the relative movement of the dump body with respect to the cable lift permits a lengthening or an increase in the effective length of the cable when the dump body is elevated and a reduction in this effective length when the dump body is depressed or lowered, owing to the take-up of an appropriate portion of the cable incident to its engagement with the cable lift. Quite obviously, as the effective length of the cable is increased by the upward movement of the dump body, the tail-gate 2 is permitted to gravitate to open or discharge position, as indicated in dotted lines in Figure 1.

A vitally important feature of the invention is the rapidity with which the tail-gate is opened in relation to the upward speed of movement of the dump body. In practice it is contemplated that, generally speaking, the length of the cable arm is such and the relation of the cable connection to the cable lift is such that the full approximately 90° movement of the tail-gate is secured when the body has raised approximately 8°. Thus the ratio of speed of movement of the tail gate to that of the dump body is approximately 11 to 1. As a result of this arrangement, when the dump body has reached an inclination tending to cause any object therein to gravitate toward the tail-gate, the tail-gate has reached a fully open position, and thus if a heavy object in the dump body, such as a large rock or the like, should under a comparatively slight inclination of the dump body move toward the tail-gate, there will be no liability of such object injuring the tail-gate or possibly breaking it loose from its connections. This is an important feature of the present invention, as it eliminates any possibility of injury to the tail-gate or side-board from any object in the dump body which might tend to a discharge movement at a comparatively slight inclination of the dump body.

When the cable arms reach an operative position, that is, engage the stops in the side brackets, the operating cable 10 is just clear of the cable lift 20. No further movement of the cable is possible and the cable is taut at all times. The cable arms are assisted in starting movement and cushioned at their limit position by springs 40 connected intermediate the free ends of the cable arms from the body. These springs are arranged to be under tension when the cable arm is in normal position so that in the initial movement of such arms the springs assist in such movement, while in the approach to final position the springs serve to cushion the movement of the arms and thereby the movement of the tail-gate.

The invention, while shown and described in connection with the tail-gate of a dump body, is also readily and conveniently applicable to that type of dump body rockable about a longitudinal axis and designed for dumping through either side wall. This construction is illustrated more particularly in Figure 4, wherein the parts previously described in connection with the tail-gate are substantially duplicated. Here the dump body, indicated at 24, is provided with side walls 25 secured to a shaft 26, and supported from the body by central and side brackets, as in the construction shown in Figures 1, 2 and 3. The shaft 26 is provided at the respective ends with cable arms 27, to which arms the opposing side boards or gates at each end of the dump wagon are connected by a cable 28 passing over rollers 29 carried by the dump body immediately adjacent and somewhat below the plane of the central longitudinal line of the cable arm 27. These cables 28 pass through eyes 30 carried by the rear end stakes 31 and under pulleys 32 carried by the dump body near the axial support thereof. A cable lift 33 similar to the cable lift previously described and supported on a jack 34 carried by the frame of the vehicle is in position to receive or release the cable in the dumping operation of the body.

The side-boards or gates 25 are held in closed position by latches governed from the seat of the vehicle by the driver so that either of the side-boards may be released for dumping in accordance with the desired dumping action of the dump body. Obviously, as the dump body rocks on its longitudinal axis, the release gate is freed of the normal cable pull holding it in closed position owing to the slack produced in the cable as the rising pulley 32 approaches and moves above the cable lift 33. Here, as in the preferred form, the cable arm engages the side brace to limit tie movement of the side gate or board in dumping relation and also to assist and prevent unnecessary strains upon the cable.

As a characteristic feature of the present invention, the bottom of the dump body in each of the forms illustrated, indicated at 36 in the form shown in Figures 1, 2, and 3 and at 37 in the form shown in Figure 4, has the terminal edge or edges thereof adjacent the dumping section turned down over the shaft 4, as indicated at 38 in Figures 1, 2 and 3 and 39 in Figure 4. This prevents the material from reaching the shaft and insures a smooth, easy delivery of the material over the shaft.

The essential feature of the present invention consists in providing a simple cable connection with the dumping section or discharge element, with means provided whereby the effective length of this cable may be increased as the dump body moves to dumping position and decreased as the dumping body moves to normal or lowered position. These variations in the increase in the effective length of the cable are utilized to permit the discharge element to move to open position or to draw it to closed position.

It will be obvious from the operation described that the opening and closing of the discharge element of the dump body is automatically performed in the raising and lowering of the dump body, and that the manual control of the cable lift provides a driving means by which the discharge element may be permitted to remain at open position during and after the return of the dump body to normal position, a condition which is desirable under some conditions.

What is claimed as new is:—

1. The combination of a vehicle frame, a dump body swingable to and from a dumping position, an element movable to an open or closed position relative to the body, a cable for operating the element, a single cable lift carried by the frame and interposed in the path of movement of the cable incident to the swinging operation of the dump body, said cable lift increasing or decreasing the effective length of the cable and thereby correspondingly influencing the said element in the dumping operations of the body, said cable lift being manually operable for movement beyond the path of movement of the cable to thereby avoid the automatic closing operation of the element when desired.

2. The combination of a vehicle frame, a dump body, a tail gate therefor, cable arms carried by the tail gate and movable therewith, a cable having its terminals connected to the cable arms and extending across the front of the dump body, a cable lift carried by the frame and normally in the path of movement of the cable in the return of the dump body to normal position, a jack for supporting the cable lift, and means for swinging the jack to move the cable lift beyond the path of movement of the cable.

3. The combination of a vehicle frame, a dump body, a tail gate therefor, cable arms carried by the tail gate and movable therewith, a cable having its terminals connected to the cable arms and extending across the front of the dump body, a cable lift carried by the frame and normally in the path of movement of the cable in the return of the dump body to normal position, a jack for adjustably supporting the cable lift, and means for swinging the jack to move the cable lift beyond the path of movement of the cable.

4. A swinging dump body, a body carrier, a load controlling closure for the body, arms connected to said closure, means for limiting the movement of the arms to hold the open position of the closure substantially in the plane of the bottom of the dump body, a single cable slidably supported by the body and terminally connected to said arms, and a single means on the body carrier and effective to vary the effective length of such cable in the movements of the body to and from a dumping position relative to said carrier, said means through the cable compelling a closure closing movement of the arms or permitting a closure opening movement thereof in accordance with the movement of the body.

HOLMAN HARRY LINN.